(No Model.) 2 Sheets—Sheet 1.

C. H. PALMER, Jr.
SULKY.

No. 501,656. Patented July 18, 1893.

Witnesses:

Inventor.
Charles H. Palmer Jr.
per
T. W. Porter
Attorney.

(No Model.) 2 Sheets—Sheet 2.

C. H. PALMER, Jr.
SULKY.

No. 501,656. Patented July 18, 1893.

Witnesses:
Inventor.
Charles H. Palmer Jr.
per J. W. Porter Atty

UNITED STATES PATENT OFFICE.

CHARLES H. PALMER, JR., OF AMESBURY, MASSACHUSETTS.

SULKY.

SPECIFICATION forming part of Letters Patent No. 501,656, dated July 18, 1893.

Application filed October 12, 1892. Serial No. 448,647. (No model.)

*To all whom it may concern:*

Be it known that I, CHARLES H. PALMER, Jr., of Amesbury, in the county of Essex and State of Massachusetts, have invented a new and useful Improvement in Sulkies, which will, in connection with the accompanying drawings, be hereinafter fully described, and specifically defined in the appended claim.

Figure 1:
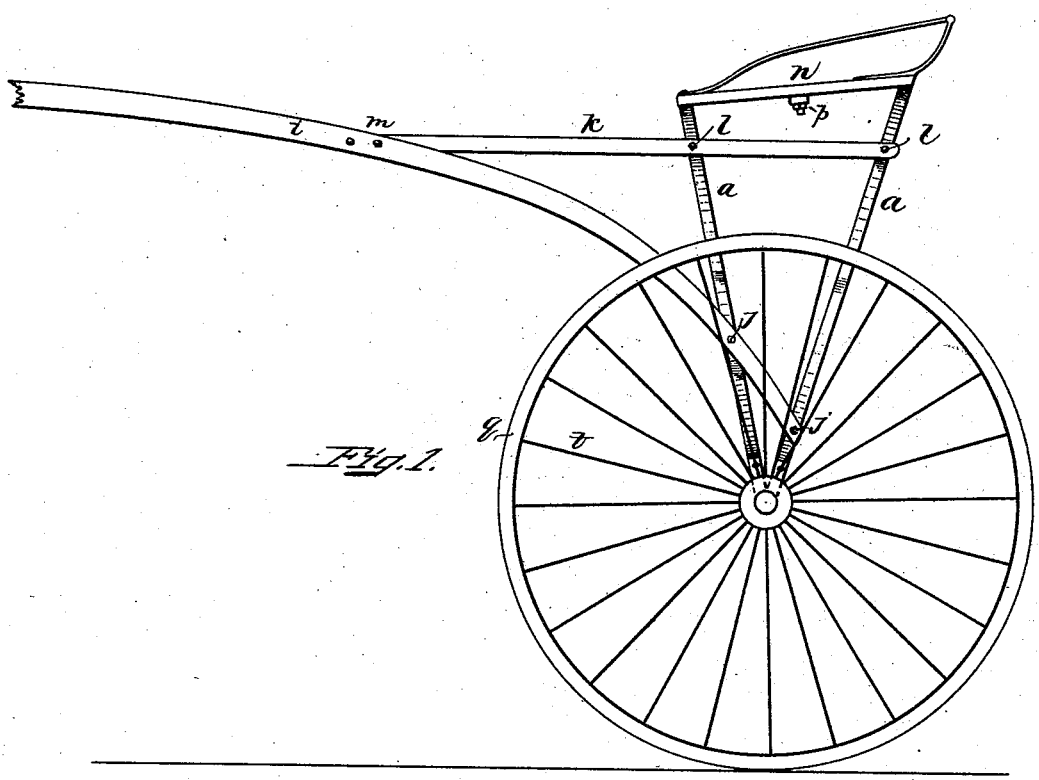
Figure 2:
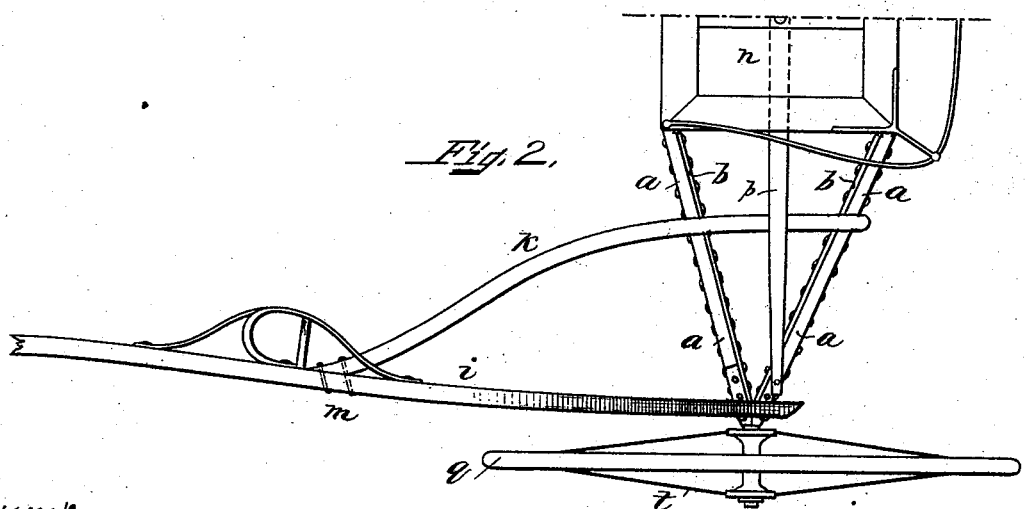
Figure 3:
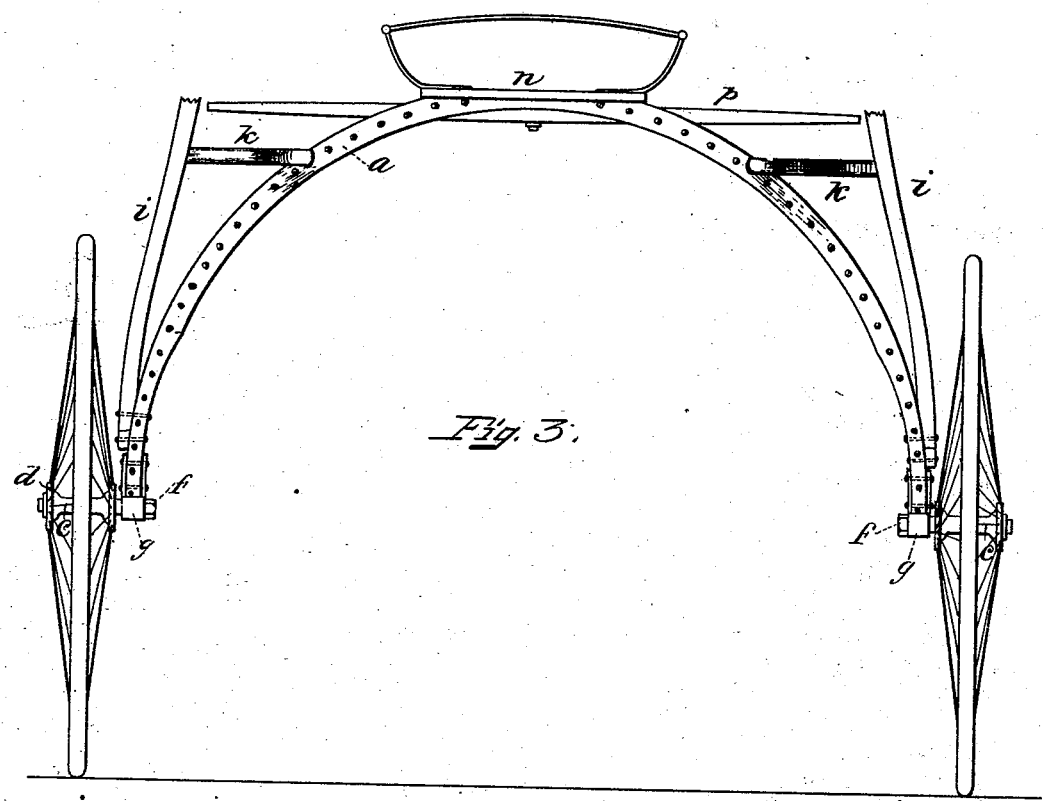
Figure 4:
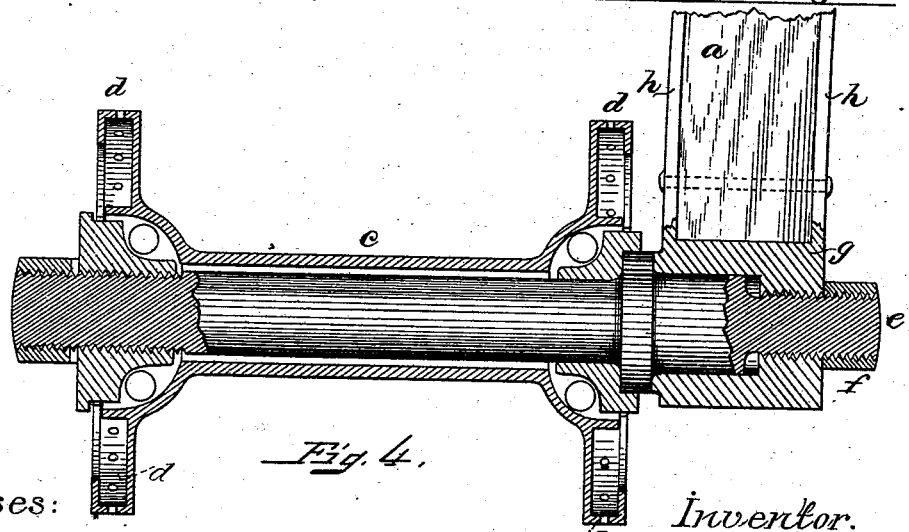

In said drawings Figure 1 is a side elevation of my improved sulky; the front portions of the shafts being broken away to increase the scale of the drawings. Fig. 2 is a top plan view of the near half of the sulky. Fig. 3 is a rear elevation of Fig. 1; and Fig. 4 is a sectional elevation of the wheel hub, the axle arm and the lower end of the axle stock and means for uniting the axle arm and stock together.

The object of my invention is to produce a trotting sulky, so called, that is both light and strong. And for these purposes I construct my sulky preferably with a two part stock bent to a semicircle and reinforced with thin steel, with the arms of the axle inserted in said stock at right angles thereto; with the shafts at their rear ends secured to said stock; and with curved pieces secured to the stock at their rear ends and at the opposite end secured to the shafts. While the seat is mounted upon the axle at the apex thereof, with the whiffletree pivoted beneath the seat; all as will be next herein described and then pointed out in the appended claim.

Referring again to said drawings, $a$, $a$ represent the two parts of my axle stock, which may be formed of bent hickory with the plates of steel $b$, thereto riveted, as shown. The wheel hub is shown at $c$, with flanges $d$ for the spokes, and mounted on axle arm $e$, secured by nut $f$ in metal block $g$, which by its integral straps $h$ is secured to the lower ends of stock $a$, as shown. Said arm $e$ being at right angles to stock $a$ where the arm is secured to the axle. The shafts $i$ are bent downward at their rear ends and are secured to stock $a$ at $j$, $j$, as shown; and bars $k$, $k$ are also secured to stock $a$ above shafts $i$ at $l$, $l$, as shown. Said bars $l$ extend forward and are secured to shafts $i$ at $m$. The seat $n$ is secured to stock $a$ at the apex of the arch, and the whiffletree $p$ is preferably pivoted to the under side of the seat. I have shown metal wheels $t$ with rubber tires $q$, but any kind of wheels may be used with my sulky, as I make no claim to the wheels. And the steel plates $b$ may be upon one or both sides of stock $a$, or they can be arranged upon the top and bottom of the stock. And the peculiar form of the shafts $i$ and pins $k$, may be varied without departing from the spirit of my invention.

I claim and desire to secure by Letters Patent—

A sulky formed with a two part axle arched as described, the shafts $i$ bent downward at their rear ends and secured to said axle near the wheels, and the bars $k$ secured to the shafts at their front ends and to the two parts of the axle above and inside the point where said shafts connect with the axle, whereby said bars constitute both a vertical and lateral stay to the shaft, as shown and described.

CHARLES H. PALMER, JR.

Witnesses:
R. W. GODING,
T. W. PORTER.